(12) United States Patent
Ebbinghaus et al.

(10) Patent No.: US 8,768,525 B2
(45) Date of Patent: Jul. 1, 2014

(54) MEDIUM-VOLTAGE OR HIGH-VOLTAGE SWITCHGEAR COMPRISING AT LEAST ONE SWITCHING DEVICE

(75) Inventors: Werner Ebbinghaus, Waltrop (DE); Harald Fink, Ratingen (DE); Karl-Michael Schmidt, Moers (DE)

(73) Assignee: ABB Technology AG, Zurich (CH)

( * ) Notice: Subject to any disclaimer, the term of this patent is extended or adjusted under 35 U.S.C. 154(b) by 600 days.

(21) Appl. No.: 11/884,204

(22) PCT Filed: Feb. 15, 2006

(86) PCT No.: PCT/EP2006/001355
§ 371 (c)(1),
(2), (4) Date: Aug. 13, 2007

(87) PCT Pub. No.: WO2006/087174
PCT Pub. Date: Aug. 24, 2006

(65) Prior Publication Data
US 2008/0188992 A1    Aug. 7, 2008

(30) Foreign Application Priority Data
Feb. 15, 2005   (DE) .......................... 10 2005 007 017

(51) Int. Cl.
*G05D 11/00* (2006.01)
(52) U.S. Cl.
USPC .................. 700/286; 702/57; 700/17; 307/38
(58) Field of Classification Search
USPC .......................... 700/286, 17; 702/57; 307/38
See application file for complete search history.

(56) References Cited

U.S. PATENT DOCUMENTS

| | | | |
|---|---|---|---|
| 5,258,652 A | 11/1993 | Nigawara et al. | |
| 6,032,203 A * | 2/2000 | Heidhues | 710/11 |
| 6,816,757 B1 | 11/2004 | De La Ree et al. | |
| 2002/0107615 A1 | 8/2002 | Bjorklund | |
| 2003/0188049 A1 * | 10/2003 | Dickens | 710/8 |

(Continued)

FOREIGN PATENT DOCUMENTS

| | | |
|---|---|---|
| CH | 694 194 A5 | 8/2004 |
| DE | 196 30 614 A1 | 2/1998 |
| WO | 02/054562 A1 | 7/2002 |
| WO | 2005/069091 A1 | 7/2005 |

OTHER PUBLICATIONS

Cosse, R.E. Jr. et al., "Smart Industrial Substations—A Modern Integrated Approach" Petroleum and Chemical Industry Conference, 2003. Record of Conference Papers. IEEE Industry Applications Society 50th Annual, pp. 81-91.*

(Continued)

*Primary Examiner* — Tejal Gami
(74) *Attorney, Agent, or Firm* — Buchanan Ingersoll & Rooney PC

(57) ABSTRACT

The disclosure relates to a medium-voltage or high-voltage switchgear comprising at least one switching device. The aim is to enable the associated switchgear to be functionally integrated with the greatest possible technical functional comfort. To this end, the switching device or the switching devices is/are respectively provided with a data and/or control interface, with the aid of which the same is/are linked to an electronic master terminal via a data and/or control line such that the switching devices can be triggered by the electronic master terminal and the control thereof can be integrated in a process, particularly an industrial process.

14 Claims, 1 Drawing Sheet

(56) References Cited

U.S. PATENT DOCUMENTS

2003/0197426 A1* 10/2003 Carson et al. .................. 307/40
2003/0229405 A1   12/2003 Sugihara et al.
2004/0236526 A1   11/2004 Wakida et al.
2005/0135030 A1*  6/2005 Jonas et al. ..................... 361/71

OTHER PUBLICATIONS

Duncan et al., "Protection, Metering, Monitoring and Control of Medium Voltage Power Systems", IEEE 2002, pp. 1-8.*
International Search Report.

* cited by examiner

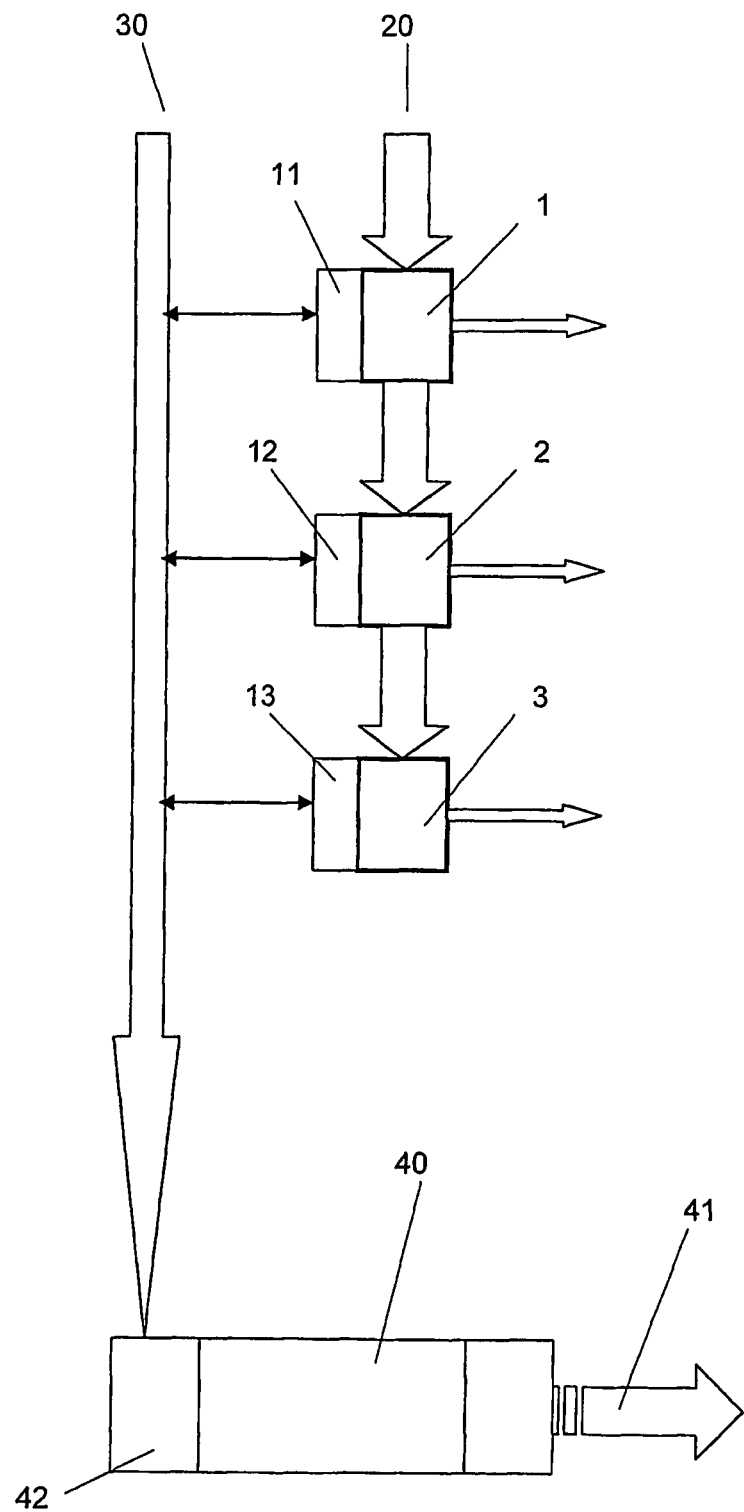

MEDIUM-VOLTAGE OR HIGH-VOLTAGE SWITCHGEAR COMPRISING AT LEAST ONE SWITCHING DEVICE

The invention relates to a medium-voltage or high-voltage switchgear comprising at least one switching device.

Switching devices or a switchgear comprising a plurality of switching devices are combined in an industrial installation mostly in the area of a central energy supply station.

In large industrial installations, for example in mass production systems or in chemical plants, autonomous production areas are often divided off within the industrial installations and have a dedicated energy supply station or a dedicated switchpanel for medium voltage.

For safety-related reasons, these switchpanels are often monitored separately and on-site, because voltages of up to 42 kV are used there.

Due to the fact that a high degree of automation exists in mass production systems, functional integration of the switchgear assigned thereto is required as well.

The invention is thus based on the object of developing a medium-voltage or high-voltage switchgear of the generic type to the effect that functional integration of the assigned switchgear as well is made possible with the highest possible technical functional convenience.

According to one embodiment of the invention, the object is achieved in a medium-voltage or high-voltage switchgear of the generic type by various features of the disclosure.

Further advantageous embodiments are also specified.

The essence of the invention is that the switching device or the switching devices is/are each provided with one data and/or control interface, with the aid of which the same is/are interconnected via a data and/or control line such that the switching devices can be triggered by an electronic control center and their control can be integrated in a process, particularly an industrial process. With the introduction of these means, the switchgear can now also be integrated in an industrial process.

Even though the switchgear does not have a function which has a direct impact on the actual assembly or production process, there may be operating states in which an emergency shutdown on load needs to be generated or in the case of a short circuit.

However, if these situations arise, it is of considerable advantage if these operating states of the switchgear can be recorded in a control center. Furthermore, it may also be the case that new electric machines, which necessitate the disconnection of certain cable runs, are integrated within the process or a production installation. To also monitor this from the control center tremendously increases the safety for the fitting personnel as well as for the machines. Furthermore, it is therefore now also advantageously possible to automatically identify when short circuits occur in certain supply runs. For the localization of the cause, the cause can thereby aid by integrating the switching states of the switchgear as well.

The more complex the production processes, the more advantageous the use of the medium-voltage or high-voltage switchgear as claimed in the invention.

In an advantageous embodiment it is specified that an electronic unit for converting the control signals of the data and/or control line into trigger signals for actuating the switching device is implemented within the switchgear, in particular within the switching device housing. The switching devices are thus now equipped with autonomous communication evaluation. In the technical sense, the switching devices thus become intelligent.

Furthermore, it is advantageously provided that sensor signals, such as switching state feedback signals and error signals of the switching device, can automatically be fed back to the electronic control center as well. The switching device is thus also integrated in the production process to which the field devices of the production devices are otherwise connected.

The most expedient way, but not the only way, is integration in a bus line system is used.

Further possibilities for communication consist in that the interconnection in terms of data and/or signals of the data and/or control interface(s) occurs a connection or a network of wireless connections, such as infrared or Bluetooth or W-LAN.

Furthermore, provision is made for at least one protocol converter to be provided which is implemented in the switching device or at least assigned to the switching device and in which automatic adaptation to the communicated electronic protocol which is used on the data and/or signal line occurs automatically.

The switching device is thus now capable of being connected to different bus protocol systems. Should certain drivers be required for doing so, the automatic data transfer interface of a switching device can search for said driver via an implemented web browser and can thus automatically calibrate the system according to the corresponding electronic transmission protocol with, so to speak, automatic plug and play.

For a remote diagnosis, provision is made for the data and/or control interface to be capable of being triggered with interrogation, also for the purpose of remote maintenance. The remote maintenance can thereby take place via a respective client's internal data network (intranet or via the control center), or else externally via the Internet. Thus, for example, the manufacturer and/or distributor of the switching devices can access these devices by way of service in an authorized manner for the purpose of error analysis or remote maintenance.

Altogether, the result is a coordinated intelligent switching device or a corresponding switchgear.

The invention is illustrated in the drawing and will be described below in more detail.

The illustration shows a switchgear comprising a plurality of switching devices. An incoming electric three-phase run 20 is subdistributed in a switchgear comprising the respective three-phase switching devices 1, 2 and 3. The switches for switching on load and so-called disconnectors are arranged within the switching devices 1, 2, 3. They are motor-driven or, in special cases, are operated manually.

Data and communication interfaces 11, 12, 13 are arranged within each switching device 1, 2, 3. These data and communication interfaces enable a communication via a bus line 30, which, in turn, is data-connected to the control center 40. In addition to the actuation for the individual switches, sensors, position sensors, temperature sensors, etc. are arranged within the switching device 1, 2, 3.

The access to the control center or vice versa occurs via the protocol 42, which is set up on the bus line.

Corresponding protocol converters can also be implemented within the interfaces 11, 12 and 13. The control center, from which not only the monitoring of the switchgear occurs, but which can also trigger the switching signals, if applicable, can in this case realize a corresponding communication interface as a bus line, or in a wireless manner as a Bluetooth or infrared connection, for the purpose of error diagnosis or remote control or access to a superordinate control center. Here, Internet browsers, with which remote control or remote maintenance, but at least remote diagnosis, is possible, can either be installed in the control center or else even in the data and communication interfaces 11, 12 and 13 of the switching devices 1, 2 and 3.

In an exemplary embodiment, an electronic communication unit is implemented within the switching device 1, 2, 3 with which unit data interchange via a data network can be triggered either via the control center 40 or directly. In an exemplary embodiment, the data network includes an intranet interface and/or an Internet interface 41.

According to the object, in this way the switching device can also be integrated in a production installation in terms of control. Each switching device 1, 2, 3 can be localized and triggered via respective individual addressing.

The invention claimed is:

1. A medium-voltage or high-voltage switchgear comprising:
   at least one switching device, each switching device including a respective data and/or control interface;
   a data and/or control line connected to each data and/or control interface to enable each switching device to be triggered by an electronic control center connected to the data and/or control line; and
   at least one protocol converter comprised in the at least one switching device, the at least one protocol converter being configured to:
   detect data and/or signals received via the data and/or control line,
   determine an electronic communication protocol of the detected data and/or signals,
   modify automatically an operating protocol of the at least one switching device according to the determined electronic communication protocol of the data and/or signals received via the data and/or control line such that the at least one switching device is configured to be controlled using the data and/or signals received via the data and/or control line, and
   download a driver for the determined electronic communication protocol to modify the operating protocol of the at least one switching device, when the driver for the determined electronic communication protocol is not present in the at least one protocol converter, wherein:
   the at least one protocol converter comprises a protocol converter corresponding to each one of the at least one switching device, respectively, and each protocol converter is comprised in a respective one of the at least one switching device, respectively;
   the data and/or control interface is configured to be triggered with interrogation and accommodate remote maintenance;
   the at least one protocol converter is configured to determine the electronic communication protocol of the data and/or signals by automatically obtaining information about the electronic communication protocol via the data and/or control line;
   the at least one protocol converter is configured to modify automatically the operating protocol of the at least one switch device based on the obtained information about the electronic communication protocol;
   the at least one protocol converter is configured to automatically obtain the information about the electronic communication protocol by automatically searching for a driver for the electronic communication protocol; and
   the at least one protocol converter is configured to automatically obtain the information about the electronic communication protocol by automatically searching for the driver for the electronic communication protocol via an HTTP client.

2. The medium-voltage or high-voltage switchgear as claimed in claim 1, wherein the data and/or signals received via the data and/or control line comprise at least one control signal, and
   the at least one protocol converter is configured to convert the at least one control signal according to the determined electronic communication protocol into at least one trigger signal for actuating the at least one switching device.

3. The medium-voltage or high-voltage switchgear as claimed in claim 2, wherein at least one switching device is configured to output sensor signals via the data and/or control line.

4. The medium-voltage or high-voltage switchgear as claimed in claim 1, wherein the data and/or signal line comprises a bus line.

5. The medium-voltage or high-voltage switchgear as claimed in claim 1, wherein the data and/or signal line comprises a ring bus line, and a plurality of switching devices among the at least one switching device are interconnected via the ring bus line.

6. The medium-voltage or high-voltage switchgear as claimed in claim 1, wherein the data and/or control line comprises at least one of a wired connection and a wireless connection to each data and/or control interface, respectively.

7. The medium-voltage or high-voltage switchgear as claimed in claim 1, wherein the at least one switching device comprises an electronic communication unit configured to interchange data via a data network either via the control center or directly.

8. The medium-voltage or high-voltage switchgear as claimed in claim 7, wherein the data network includes an intranet interface and/or an Internet interface.

9. The medium-voltage or high-voltage switchgear as claimed in claim 3, wherein the data and/or signal line comprises a bus line.

10. The medium-voltage or high-voltage switchgear as claimed in claim 4, wherein a plurality of switching devices among the at least one switching device are interconnected via the bus line.

11. The medium-voltage or high-voltage switchgear as claimed in claim 5, wherein the data and/or control line comprises at least one of a wired connection and a wireless connection to each data and/or control interface, respectively.

12. The medium-voltage or high-voltage switchgear as claimed in claim 3, wherein the sensor signals comprise at least one of switching state feedback signals and error signals.

13. The medium-voltage or high-voltage switchgear as claimed in claim 6, wherein the wireless connection is at least one of infrared, Bluetooth, and W-LAN.

14. The medium-voltage or high-voltage switchgear as claimed in claim 1, wherein the at least one protocol converter is configured to automatically obtain the information about the electronic communication protocol by automatically searching for the driver for the electronic communication protocol via a web browser.

* * * * *